(12) United States Patent
Ashizawa

(10) Patent No.: US 6,392,328 B1
(45) Date of Patent: May 21, 2002

(54) VIBRATION MOTOR

(75) Inventor: Takatoshi Ashizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/523,306

(22) Filed: Mar. 10, 2000

(30) Foreign Application Priority Data

Mar. 11, 1999 (JP) .......................................... 11-065134

(51) Int. Cl.⁷ .............................................. H01L 41/08
(52) U.S. Cl. .................. 310/323.01; 310/328
(58) Field of Search ...................... 310/323.01–323.09, 310/311, 321, 328

(56) References Cited

U.S. PATENT DOCUMENTS

| | | | |
|---|---|---|---|
| 5,039,889 A | 8/1991 | Janta et al. ................. | 307/514 |
| 5,073,739 A | 12/1991 | Iijima et al. ................. | 310/323 |
| 5,101,132 A | 3/1992 | Yamaguchi .................. | 310/323 |
| 5,105,117 A | 4/1992 | Yamaguchi .................. | 310/323 |
| 5,136,200 A | 8/1992 | Takizawa et al. ........... | 310/323 |
| 5,140,215 A | 8/1992 | Yamaguchi .................. | 310/323 |
| 5,189,331 A * | 2/1993 | Mukohjima et al. ........ | 310/323 |
| 5,191,668 A | 3/1993 | Euller et al. .................. | 8/158 |
| 5,200,665 A | 4/1993 | Iijima .......................... | 310/323 |
| 5,416,375 A | 5/1995 | Funakubo et al. .......... | 310/323 |
| 5,783,899 A | 7/1998 | Okazaki ...................... | 310/317 |
| 5,852,336 A | 12/1998 | Takagi ......................... | 310/323 |
| 5,912,525 A * | 6/1999 | Kobayashi et al. ......... | 310/323 |

FOREIGN PATENT DOCUMENTS

| | | |
|---|---|---|
| JP | 61-244280 | 10/1986 |
| JP | 63-277477 | 11/1988 |
| JP | 7-322657 | 12/1995 |

OTHER PUBLICATIONS

Piezoelectric Linear Motors for Moving Optical Pickup, (5ᵗʰ Symposium on Dynamics Related to Electromagnetic Force, Collected Papers: Joint Auspices of Japan Mechanical Society, Electrical Society, and Japan AEM Society, Jun. 9–11, 1993, Hitachi City), pp. 1–7.
S. Ueha, et al., Ultrasonic Motors Theory and Applications, 1993, pp. 131–195.
Excerpt from White Series No. 132, "Ultrasonic Motors", ed. Torikeppsu, dated Dec. 20, 1991, pp. 145–146.

* cited by examiner

Primary Examiner—Brian Sircus
Assistant Examiner—Michael C. Zarroli

(57) ABSTRACT

A vibration motor including a vibration element having a driving force output member, which is excited to produce a combination of different vibrations and to generate an elliptical vibration in the driving force output member. A relative moving member in pressure contact with the driving force output member is driven by the elliptical vibration to move in relative motion with respect to the vibration element. A pressure support member is fixed between the vibration element and a first base member, to place the vibration element in pressure contact with the relative moving member. A second base member supports the relative moving member. A vibration absorbing member absorbs vibration produced by the elliptical vibration generated by the vibration element in at least one of the relative moving member and the pressure support member. The vibration absorbing member may be located between the first base member and the pressure support member, between the pressure support member and the vibration element, and between the relative moving member and the second base member.

19 Claims, 7 Drawing Sheets

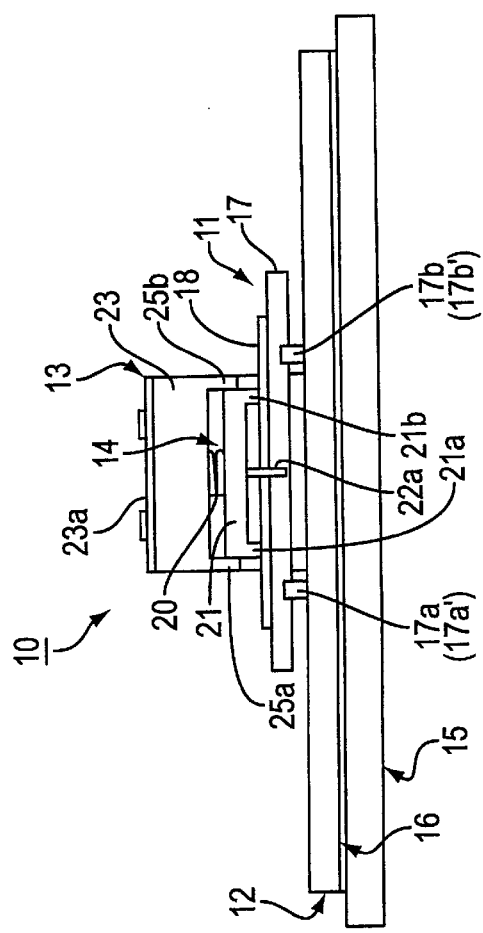
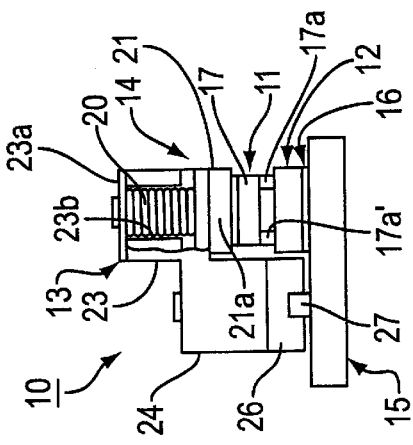

VIBRATION MOTOR

CROSS-REFERENCE TO RELATED APPLICATIONS

This application is based upon and claims priority of Japanese Patent Application No. 11-065134, filed Mar. 11, 1999, the contents being incorporated herein by reference.

BACKGROUND OF THE INVENTION

1. Field of the Invention

The present invention relates to a vibration motor including a vibration element in which a plurality of different vibrations are combined to generate elliptical vibratory motion. More specifically, the present invention is related to a vibration motor, including a base, a relative moving member, and a vibration absorbing member interposed between the base member and the relative moving member to prevent both the generation of noise and the reduction of driving efficiency by absorbing the vibration of the relative moving member, thereby eliminating the vibration of the base.

2. Description of the Related Art

Vibration motors which use so-called degenerate modes having different form, causing the simultaneous generation of two different vibrations, are disclosed, for example, in the *Fifth Dynamic Symposium Relating to Electromagnetic Force, Collected Papers*, Tomikawa, page 393.

FIG. 11 is a perspective view of a vibration motor 1 having a vibration element 2 disclosed by the Tomikawa reference. Moreover, FIGS. 12A–12B are illustrative diagrams of the vibration element 2, wherein FIG. 12A is a top view, FIG. 12B is a side view, and FIG. 12C is a diagram showing examples of waveforms representing two different vibrations L1, B4 generated by the vibration element 2.

As shown in FIGS. 11, 12A and 12B, the vibration element 2 includes an elastic member 3 and an electromechanical conversion element 4 (referred to hereinbelow, where appropriate, as a "piezoelectric member") which converts electrical energy into mechanical energy.

The respective dimensions of the vibration element 2 are set such that the natural frequencies of the first order longitudinal vibration L1 and the fourth order torsional vibration B4 about coincide. A piezoelectric member 4 having a plurality of electrodes 5a, 5b, 5g, 5p is affixed to one flat surface of the elastic member 3. Moreover, two projecting driving force output members 3a, 3b are formed on a flat side of the elastic member 3, opposite to the side to which the plurality of electrodes 5a, 5b, 5g, 5p are affixed.

As shown in FIGS. 12B and 12C, the driving force output members 3a, 3b are arranged with respect to the length direction of the vibration element 2 in positions which coincide with the outside antinode positions 11, 14 among the four (4) antinode positions 11, 12, 13 and 14 of the bending vibration B4 which is generated by the vibration element 2.

The electrodes 5a, 5b are respectively excited by high frequency drive voltages $V_A$, $V_B$ having phase mutually displaced by about $\pi/2$. As shown in FIG. 12C, upon exciting the electrodes 5a, 5b, there simultaneously arise in the elastic member 3 a first order longitudinal vibration L1 and a fourth order bending vibration B4 which vibrates in the thickness direction of the vibration element 2. The combined the longitudinal vibration L1 and the bending vibration B4 generated in the elastic member 3 cause the respective bottom surfaces of the driving force output members 3a, 3b to vibrate in a manner which displaces them circumferentially (referred to herein as elliptical motion). The vibration element 2 is brought into pressure contact with a relative moving member 6 such that the elliptical motion of the driving force output members 3a, 3b moves the relative moving member in relative motion.

In the abovedescribed manner, the vibration element 2 generates a rectilinear relative movement, in the direction of the double arrow in FIG. 11, between the relative moving member 6 and the driving force output members 3a, 3b with which the relative moving member 6 is in pressure contact. Furthermore, in the vibration element 2 using degenerate modes having different form, the longitudinal vibration L1 generated in the vibration element 2 is used as a propulsion force in the driving direction. Moreover, the bending vibration B4 confers a function which propagates the longitudinal vibration L1 intermittently to the relative moving member 6 (referred to herein as a "clutch function"). The clutch function causes rectilinear relative movement to be generated in one direction between the vibration element 2 and the relative moving member 6.

SUMMARY OF THE INVENTION

The present applicant has found that when the vibration motor 1 is driven, a base member 7 of the relative moving member 6 vibrates at its natural frequency, and generates noise. The generation of noise is a very serious problem, since silent operation is an important feature of vibration motors.

Moreover, because the relative moving member 6 also vibrates accompanying vibration arising in the base 7, the state of contact between the relative moving member 6 and the driving force output members 3a, 3b of the vibration element 2 becomes poor. Because of the poor contact between the relative moving member 6 and driving force output members 3a, 3b, the clutch function is impeded, driving efficiency decreases, and driving performance becomes poor.

It is an object of the present invention to provide a vibration motor having a vibration element using degenerate modes having different form which overcomes the problems of the conventional vibration motor and eliminates both the generation of noise originating in vibration of the base member, and the decrease of driving efficiency when driving the vibration motor.

The present inventor obtained the following information with respect to the origin of the vibration of the base member 7. Specifically, in the vibration element 2 using degenerate modes having different form, because of the clutch function, the relative moving member 6 is normally in a state in which it is struck by the driving force output members 3a, 3b of the vibration element 2. When the relative moving member 6 is struck by the driving force output members 3a, 3b, vibration is generated in the relative moving member 6 accompanying the striking. The vibration accompanying the striking is transmitted from the relative moving member 6 to the base member 7, causing the base member 7, which generally has a low natural frequency, to vibrate at its own natural frequency.

The present invention is based on the new information that both the generation of noise and the reduction of driving efficiency can be prevented by interposing a vibration absorbing member, which can absorb the vibration of the relative moving member, between the base member and the relative moving member, to thereby eliminate the vibration of the base.

Objects and advantages of the present invention are achieved in accordance with embodiments of the present invention with a vibration motor comprising a vibration element including a driving force output member, which is excited to produce a combination of plural different vibrations, and generates an elliptical vibration in the driving force output member; a relative moving member in pressure contact with the driving force output member, to move in relative motion with respect to the vibration element; a first base member; a pressure support member, fixed between the vibration element and the first base member, to place the vibration element in pressure contact with the relative moving member; a second base member to support the relative moving member; and a vibration absorbing member to absorb vibration produced by the elliptical vibration generated by the vibration element in at least one of the relative moving member and the pressure support member, the vibration absorbing member being disposed in at least one of between the first base member and the pressure support member, between the pressure support member and the vibration element, and between the relative moving member and the second base member.

Objects and advantages of the present invention are achieved in accordance with embodiments of the present invention with a vibration motor comprising a vibration element including a driving force output member, which is excited to produce a combination of plural different vibrations, and generates an elliptical vibration in the driving force output member; a relative moving member, in pressure contact with the driving force output member, to move in relative motion with respect to the vibration element; a pressure support member to place the vibration element in pressure contact with the relative moving member; a base member to support the relative moving member and the pressure support member; and a vibration absorbing member to absorb vibration arising in at least one of the relative moving member and the pressure support member produced by the elliptical vibration generated by the vibration element; the vibration absorbing member being disposed in at least one of between the base member and at least one of the relative moving member and the support member, and between the vibration element and the pressure support member.

In accordance with embodiments of the present invention, at least one of the plurality of different vibrations of the vibration motor is in a direction approximately parallel to the direction in which the pressure support member generates pressure force.

In accordance with embodiments of the present invention, the vibration element comprises a plurality of driving force output members, and the phase of the elliptical vibration which is respectively generated in the plurality of driving force output members mutually differs.

In accordance with embodiments of the present invention, the hardness of the driving force output member is at least 75 on the Rockwell M scale.

Furthermore, in accordance with embodiments of the present invention, the vibration absorbing member is united to at least one of the first base member, the second base member, the base member, and the relative moving member.

Objects and advantages of the present invention are achieved in accordance with embodiments of the present invention with a vibration motor comprising a vibration element including a driving force output member having Rockwell M scale hardness of at least 75, and which generates an elliptical vibration comprising a plurality of different vibrations in the driving force output member; a relative moving member in pressure contact with the driving force output member to move in relative motion with respect to the vibration element; a base member to support at least one of the vibration element and the relative moving member; and a vibration absorbing member to absorb vibration generated by the vibration element, the vibration absorbing member being disposed in at least one of between the base member and the vibration element, and between the relative moving member and the base member.

In accordance with embodiments of the present invention, the vibration motor further comprises an optical switch including at least one first optical fiber which is fixed to the base member, and at least one second optical fiber which is fixed to a portion which is relatively movable with respect to the base member, wherein relative movement of the at least one first optical fiber and the at least one second optical fiber causes optical connection and disconnection of the at least one first optical fiber and the at least one second optical fiber.

Objects and advantages of the present invention are achieved in accordance with embodiments of the present invention with a vibration motor comprising a vibration element including a driving force output member having a Rockwell M scale hardness of at least 75, and which generates an elliptical vibration comprising of a plurality different vibrations in the driving force output member; a relative moving member in pressure contact with the driving force output member to move in relative motion with respect to the vibration element; a base member to support and fix the vibration element; a pressure support member to provide a force causing the vibration element and the relative moving member to contact under pressure, the pressure support member being disposed between the base member and the vibration element; and a vibration absorbing member between the pressure support member and the vibration element to absorb vibration generated by the vibration element.

In accordance with the present invention, the vibration motor further comprises an optical switch including at least one first optical fiber fixed to a portion which moves relatively with respect to the vibration element, and at least one second optical fiber fixed to a portion which moves relatively with respect to the vibration element, wherein relative movement of the at least one first optical fiber and the at least one second optical fiber causes the optical connection and disconnection of the first optical fibers and the second optical fibers.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3 is a view of the ultrasonic motor along the arrow A in FIG. 2 in accordance with the first embodiment of the present invention.

FIG. 4 is a view of the ultrasonic motor along the arrow B in FIG. 2 in accordance with the first embodiment of the present invention.

DETAILED DESCRIPTION OF THE PREFERRED EMBODIMENTS

Figure 1:
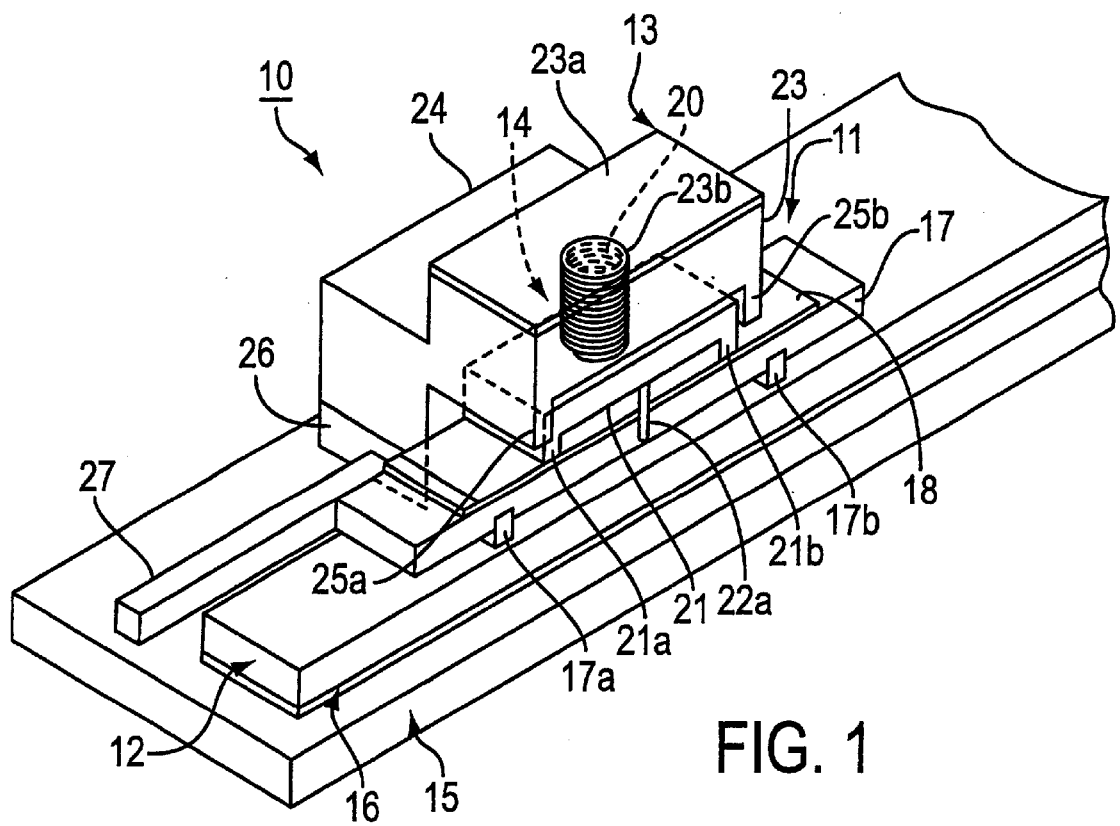
FIG. 1 is a perspective view of an ultrasonic motor in accordance with a first embodiment of the present invention.

Reference will now be made in detail to the preferred embodiments of the present invention, examples of which are illustrated in the accompanying drawings, wherein like reference numerals refer to like elements throughout.

The description hereinbelow of the preferred embodiments of the invention refer to the example of a vibration motor which is an ultrasonic motor using vibrations in the ultrasonic range.

Figure 2:
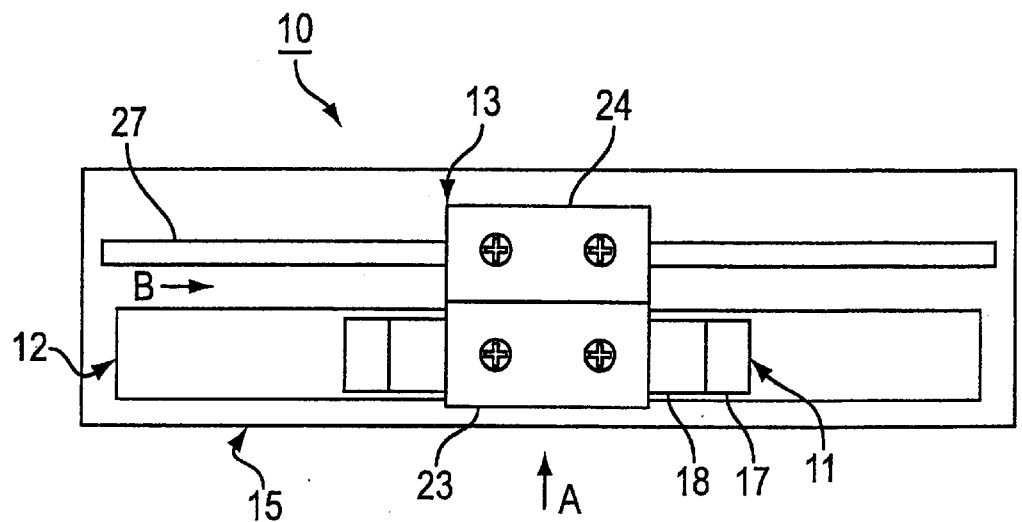
FIG. 2 is a top view of the ultrasonic motor in accordance with the first embodiment of the present invention.

FIG. 1 is an oblique view of an ultrasonic motor 10 in accordance with the first embodiment of present invention. More specifically, the view shown in FIG. 1 is a partially. simplified perspective view. FIG. 2 is a top view of the ultrasonic motor 10 in accordance with the first embodiment of the present invention. FIG. 3 is a view of the ultrasonic motor 10 seen along the arrow A in FIG. 2 in accordance with the first embodiment of the present invention. FIG. 4 is a view of the ultrasonic motor is seen along the arrow B in FIG. 2 in accordance with the first embodiment of the present invention.

As shown in FIGS. 1–4, the ultrasonic motor 10 in accordance with the first embodiment comprises a vibration element 11, a relative moving member 12, a first base member 13, a pressure support member 14, a second base member 15, and a vibration absorbing member 16. These elements will now be described in more detail hereinbelow.

Figure 5:
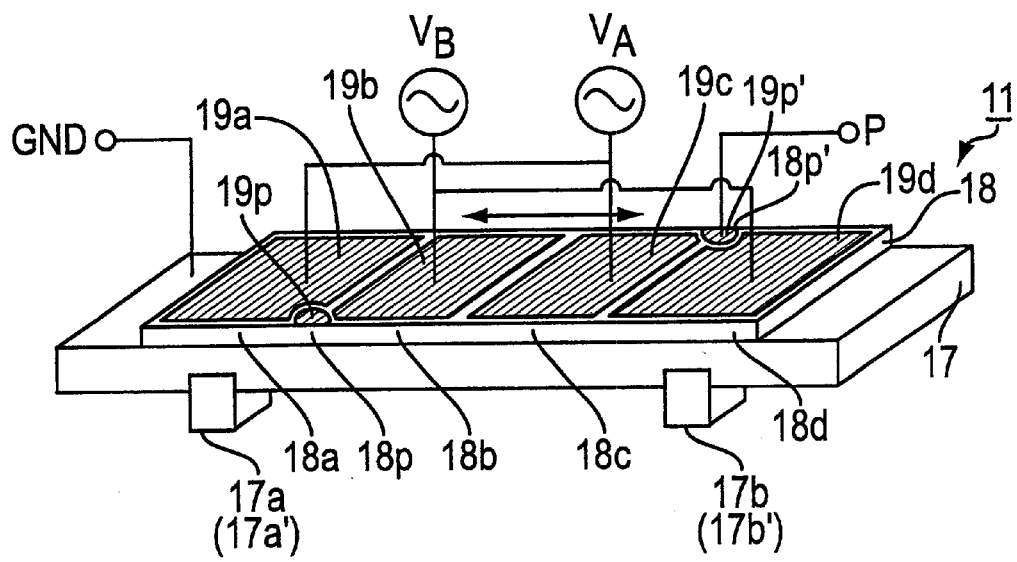
FIG. 5 is a perspective view of a vibration element in accordance with the first embodiment of the present invention.
Figure 6:
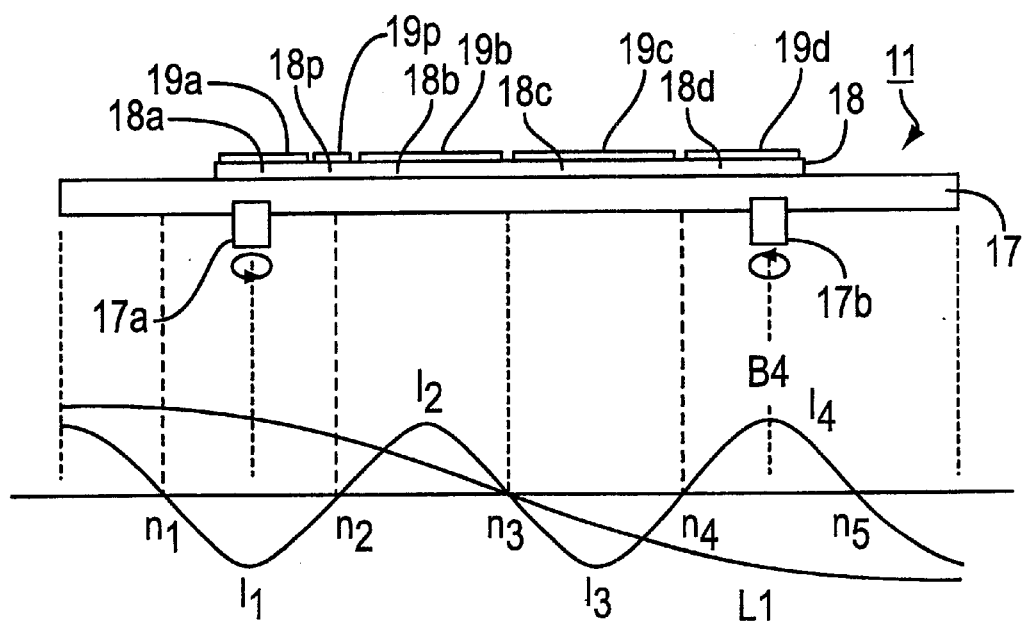
FIG. 6 is a diagram showing examples of waveforms representing two different vibrations generated in the vibration element in accordance the first embodiment of the present invention.

FIG. 5 is a perspective view of the vibration element 11 in accordance with the first embodiment of the present invention. Moreover, FIG. 6 is a diagram illustrating examples of waveforms representing the two different vibrations L1, B4 generated in the vibration element 11.

As shown in FIGS. 1–6, the vibration element 11 in accordance with the first embodiment of the invention comprises an elastic member 17 and a piezoelectric element 18 which is installed on a flat surface on one side of the elastic member 17. The elastic member 17 is preferably formed of metal materials or metallic materials having a high sharpness of resonance, such as steel, stainless steel, phosphor bronze, Erinvar material, and the like. Moreover, the dimensions of each portion of the elastic member 17 are set so that the respective natural frequencies of the first order longitudinal vibration L1 and the fourth order bending vibration B4 approximately coincide.

The piezoelectric element 18, described in more detail hereinbelow, is adhered, for example, to the flat surface of one side of the elastic member 17. Moreover, two groove portions are disposed in a width direction of the elastic member 17, spaced apart by a predetermined distance in the direction of the relative motion (the left and right direction in FIG. 3). Square bar type sliding members 17a, 17b, having a rectangular transverse sectional form, are inserted into the groove portions. The sliding members 17a, 17b have respective portions which protrude from the elastic member 17. The sliding members 17a, 17b comprise macromolecular materials. Examples of the macromolecular materials which the sliding members comprise are PTFE, polyimide resin, polyacetal, PS, PEEK, and the like.

The sliding members 17a, 17b function as driving force output members. The elastic member 17 is in pressure contact with the relative moving member 12 via the driving force output members 17a, 17b.

In accordance with the first embodiment of the invention, in order to maintain a sufficient starting thrust to transmit the elliptical motion generated in the driving force output members 17a, 17b to the relative moving member 12, the hardness of the driving force output members 17a, 17b is preferably 75 on the Rockwell M scale.

In accordance with the first embodiment of the present invention, each driving force output member 17a, 17b comprises two slide members 17a, 17a' and 17b and 17b'. As shown in FIG. 4, the two slide members 17a, 17a' of driving force output member 17a are formed at the end portions of the width direction of the vibration member 11 and are arranged in the divided respective end portions of the width direction of the vibration member 11.

As shown in FIG. 6, the driving force output members 17a, 17a', 17b, 17b' are disposed in positions which coincide with the outside antinode positions 11, 14 of the four antinode positions 11–14 of the fourth order bending vibration B4 generated in the elastic member 17. Furthermore, it is not necessary for the driving force output members 17a, 17b to accurately coincide with the antinode positions 11, 14 of the bending vibration B4. Alternatively, the driving force output members 17a, 17b may be disposed in the respective neighborhoods of the antinode positions.

The piezoelectric member 18 preferably comprises thin plate form piezoelectric elements. In accordance with first embodiment of the present invention, the thin plate form piezoelectric elements are preferably PZT (titanium zirconium plumbate). As shown in FIG. 5, the piezoelectric member 18 includes input regions 18a, 18c, which input A phase drive signals, and input regions 18b, 18d, which input B phase drive signals, and which are displaced about $\pi/2$ from the A phase drive signals. As shown in FIG. 6, the respective input regions 18a–18d are formed in succession in four (4) regions, compartmented by five (5) nodal positions n1–n5 of the bending vibration B4 generated in the elastic member 17. Specifically, the respective input regions 18a–18d are deformed by the input of the drive signals, and they do not cross over the nodal positions n1–n5, which are motionless points. Because of this, the deformation of the input regions 18a–18d is not controlled by the nodal positions n1–n5. Accordingly, the electrical energy input into the respective input regions 18a–18d can be transformed with maximum efficiency into deformations of the elastic member 17, specifically, converted into mechanical energy.

Moreover, detection regions 18p, 18p' are disposed in the nodal positions n2, n4 of the bending vibration B4. The detection regions 18p, 18p' output electrical energy as a result of the longitudinal vibration L1 generated by the vibration element 11. The vibration state of the longitudinal vibration L1 generated by the vibration element 11 can be monitored by the detection regions 18p, 18p'.

The respective surfaces of each of the input regions 18a–18d and the detection regions 18p, 18p' are covered with silver electrodes 19a–19d, 19p, 19p' in order to transfer electrical energy. The silver electrodes 19a–19d, 19p, 19p' have been omitted from FIGS. 1–4 in order to avoid complexity. In the above-described manner, drive signals can be independently input to the respective input electrodes 18a–18d, and detection signals can be output from the respective detection regions 18p, 18p'.

The silver electrodes 19a–19d, 19p, 19p' are connected to lead wires (not shown in the drawings) by soldering to transfer the electrical energy.

Furthermore, in accordance with the first embodiment of the present invention, as shown in FIGS. 5 and 6, the vibration element 11 is formed such that there is point symmetry centered on the center portion of its surface. By forming the vibration element 11 in this manner, the elliptical motion generated at the driving force output members 17a, 17b can have about the same form, and drive differences accompanying rotation in the relative movement direction are practically eliminated.

Signals having respectively suitable frequency for the longitudinal vibration L1 and bending vibration B4 of the vibration element 11 are output from a vibration unit of a drive device (not shown in the drawing). The output from the vibration unit is branched, and one of the branched outputs is amplified by an amplifier. The amplified output is then input as the A phase drive signal to the silver electrodes 19a, 19c of the input regions 18a, 18c. Moreover, the output of the other branch is phase shifted from A phase by $\pi/2$ by a phase shifter, and is then input via an amplifier to the silver electrodes 19b, 19d of the input regions 18b, 18d.

The output voltages from the detection electrodes 18p, 18p' are input to a control circuit of the drive device. The control circuit compares the output voltages of the detection electrodes 18p, 18p' with a previously set standard voltage, and controls the vibration unit by reducing the frequency when the output voltage from the detection electrodes 18p, 18p' is smaller than the standard voltage, and by increasing the frequency when the output voltage from the detection electrodes 18p, 18p' is greater than the standard voltage. The vibration amplitude of the vibration element 11 is maintained at a predetermined magnitude by the above-described control circuit.

The A phase drive signal, having a frequency which coincides with the respective natural frequencies of the longitudinal vibration L1 and the bending vibration B4, is input to the input regions 18a, 18c of the piezoelectric member 18. Moreover, the B phase drive signal, which is displaced by $\pi/2$ in phase relative to the A phase drive signal, is input to the input regions 18b, 18d. Thereupon, as shown in FIG. 6, there are simultaneously generated in the elastic member 17 a first order longitudinal vibration L1 which vibrates in the relative motion direction (direction of the double arrow in FIG. 5) and a fourth order bending vibration B4 which vibrates in an up and down direction at right angles to the relative motion direction. The direction of vibration of the bending vibration B4 is a direction approximately parallel to a pressure force exerted by a pressure support member 14, described in more detail hereinafter.

When the longitudinal vibration L1 and the bending vibration B4 are combined, elliptical motions which are mutually displaced in phase by $\pi$ are respectively generated in the driving force output members 17a, 17a' and the driving force output members 17b, 17b'.

Furthermore, to reverse the direction of relative movement of the relative moving member 6, the B phase drive signal may be set such that it has a phase displacement of $-\pi/2$ with respect to the A phase drive signal.

As shown in FIGS. 1–4, the relative moving member 12 makes pressure contact with the driving force output members 17a, 17a' and the driving force output members 17b, 17b' with a suitable pressure force.

In accordance with the first embodiment of the present invention, the relative moving member 12 is preferably a rail in the form of a long plate. Furthermore, the relative moving member 12 is preferably formed of stainless steel, copper alloy, aluminum alloy, or the like, and is fixed to and supported by a second base member 14, described in more detail hereinafter, via a vibration absorbing member 16, also described in more detail hereinafter.

In accordance with the present invention, when the ultrasonic motor 10 is started, the vibration element 11 travels linearly on the relative moving member 12 which is fixed to the second base member 14, driven by the elliptical motion respectively generated by the driving force output members 17a, 17a' and the driving force output members 17b, 17b', mutually displaced in phase by $\pi$.

In accordance with embodiments of the present invention, the vibration element 11 is placed in pressure contact with the relative moving member 12 by the pressure support member 14.

The pressure support member 14 includes a pressure member 20 which generates a pressure force, and a pressure receiving member 21 which transmits the pressure force generated by the pressure member 20. In accordance with the first embodiment of the invention, the pressure member is preferably a coil spring 20. However, the pressure member may be a disk spring or plate spring, or other type of pressure member. The spring constant and dimensions of the coil spring 20 are suitably set based on the pressure force which is set between the vibration element 11 and the relative moving member 12.

The pressure receiving member 21 is arranged between the coil spring 20 and the vibration element 11. The pressure receiving member 21 has a rectangular flat plate form. Pressure units 21a, 21b at ends of the pressure receiving member 21 are disposed projecting toward the vibration element 11. The pressure units 21a, 21b abut the upper surface of the vibration element 11 as a result of the spring force generated by the coil spring 20. The pressure units 21a, 21b are formed at positions which respectively coincide with the nodal positions n2, n4 of the fourth order bending vibration B4 generated in the vibration element 11. Accordingly, vibration attenuation due to the abutment of the pressure units 21a, 21b on the vibration element 11 is prevented. Furthermore, although not shown in the drawing, the pressure units 21a, 21b have a form such that interference with the portions which are raised up because of the soldering of the lead wires for the silver electrodes 19a–19d, 19p, 19p' can be avoided.

Moreover, through holes are formed on both sides of the center in the length direction of the pressure receiving member 21. Support pins 22a, 22b are fitted in the through holes with fastening springs. The support pins 22a, 22b pass through the through holes and partially restrain the vibration element 11. The support pins 22a, 22b fit loosely with clearance in semicircular shaped through holes formed in both end sides of the center of the length direction of the vibration element 11. The support pins 22a, 22b and the pressure receiving member 21 can restrain and set the position of the vibration element 11 with respect to the relative movement direction, and in addition can provide the desired pressure force to the vibration element 11.

In accordance with the first embodiment of the present invention, the pressure support member 14 is housed in the first base member 13. The first base member 13 comprises a hollow housing unit 23 having a rectangular exterior form, and a solid weight portion 24. As shown in FIGS. 1 and 4, the housing unit 23 and the weight portion 24 are fixed together in step form. The weight portion 24 functions to increase stability during travel by lowering the center of gravity of the traveling system including the vibration element 11, the pressure support member 14 and the first base member 13.

A cover 23a is installed on the upper portion of the housing unit 23. A cylindrical coil spring housing portion 23b is formed in the inner surface of the cover 23a. The coil spring 20 is housed in the coil spring housing portion 23b.

Projecting portions 25a, 25b which face downward are formed in both ends of the housing unit 23 in the relative movement direction. The outer surfaces of the pressure units 21a, 21b of the pressure receiving member 21 are restricted in the direction of relative motion by the inner surfaces of the projecting portions 25a, 25b of the housing unit 23. Thus, the housing unit 23 supports the pressure receiving member 21 while restricting the pressure receiving member 21 in the direction of relative movement.

One end of the coil spring 20 abuts the inner surface of the cover 23a, and the other end of the coil spring 20 abuts the upper surface of the pressure receiving member 21. The coil spring 20 generates spring force, and urges the pressure receiving member 21 toward the vibration element 11.

A guide 26 is fixed to the bottom surface of the weight portion 24. The guide 26 runs in a straight line, guided by a rail 27 disposed in a direction parallel to the relative motion direction.

The second base member 15 supports the relative moving member 12 and the rail 27. In accordance with embodiments of the present invention, the second base member 15 is preferably a flat plate made of stainless steel, copper alloy, or aluminum alloy.

The relative moving member 12 is fixed to the second base member 15 via the vibration absorbing material 16, described hereinafter. The rail 27 is directly connected to the second base member 15.

In accordance with the first embodiment of the present invention, the vibration absorbing member 16 is arranged between the relative moving member 12 and the second base member 15. The vibration absorbing member 16 may be a member which can absorb vibration arising in the relative moving member 12 caused by the elliptical motion generated by the vibration element 11. In accordance with embodiments of the present invention, the vibration absorbing member 16 is preferably a thin sheet of butyl rubber. Alternatively, the vibration absorbing member 16 may be formed of a thin sheet of lead.

By interposing the vibration absorbing member 16 between the relative moving member 12 and the second base member 14, the vibration absorbing member 16 absorbs vibration arising in the relative moving member 12. However, in accordance with the first embodiment of the present invention, the vibration absorbing member 16 is united to the entire surface of the relative moving member 12 and/or the second base member 15 by an adhesive. By adhering the vibration absorbing member 16, a layer of air is present between the relative moving member 12 and the second base member 14, and the vibration absorbing effect due to the vibration absorbing member 16 is further increased.

The operation of the ultrasonic motor 10 in accordance with the first embodiment of the invention will now be described below.

A driving device (not shown in the drawing) provides an A phase drive signal input to the input regions 18a, 18c of the vibration element 11, and a B phase drive signal, displaced by $\pi/2$ in phase with respect to the A phase drive signal, is input to the input regions 18b, 18d of the vibration element 11. As shown in FIG. 6, a first order longitudinal vibration L1, which vibrates in the relative motion direction (the direction of the double arrow in FIG. 5), and a fourth order bending vibration B4 which vibrates in a direction at right angles to the relative motion direction, are simultaneously generated in the elastic member 17. The generated longitudinal vibration L1 and bending vibration B4 are combined to generate elliptical motions mutually displaced in phase by $\pi$ in the driving force output members 17a, 17b.

The elliptical motion of the driving force output members 17a, 17b causes the vibration element 11 to move rectilinearly in one direction of the-length direction of the relative moving member 12. The first base member 13, which houses the vibration element 11 and the pressure support member 14, also moves accompanying the movement of the vibration element 11, while being guided by the rail 27.

In accordance with the ultrasonic motor 10 of the first embodiment of the present invention, the driving force output members 17a, 17b are set to a high hardness of at least 75 on the Rockwell M scale to maintain sufficient starting thrust. Because of the clutch function, the relative moving member 12 is usually struck by the high hardness driving force output members 17a, 17b, and vibration is generated accompanying the striking of the relative moving member 12.

However, in accordance with the first embodiment, the vibration absorbing member 16 is arranged between the relative moving member 12 and the second base member 15. Because of the arrangement of the vibration absorbing member 16, the vibration generated in the relative moving member 12 is absorbed by the vibration absorbing member 16, and is not transmitted to the second base member 15. As a result, the ultrasonic motor 10 in accordance with embodiments of the invention ensures sufficient starting thrust, and, moreover, vibration is not generated in the second base member 14, and the generation of noise and decrease in driving efficiency can be reliably prevented.

An ultrasonic motor in accordance with a second embodiment of the present invention will now be described below. Furthermore, in the description below, those elements which are the same as those described above with respect to the first embodiment are referred to by the like reference symbols, and duplicate descriptions of the like elements will not be repeated here.

Figure 7:
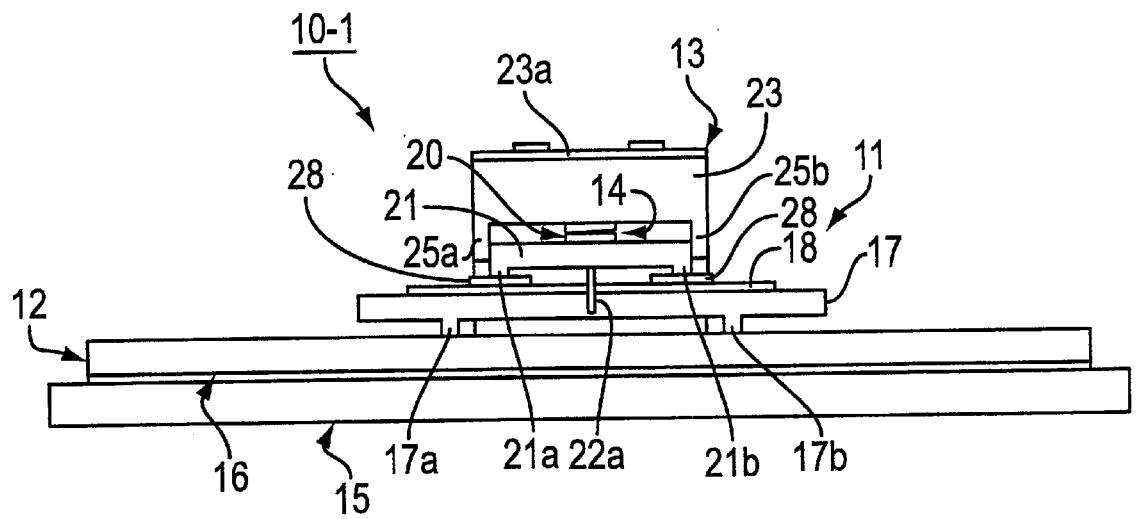
FIG. 7 is an elevation view of an ultrasonic motor in accordance with a second embodiment of the present invention.

FIG. 7 is an elevation view of an ultrasonic motor 10-1 in accordance with the second embodiment of the present invention. The second embodiment differs from the first embodiment in that a vibration absorbing member 28 is arranged, not only between the relative moving member 12 and the second base member 14, but also between the vibration element 11 and the pressure support member 14.

In order to effect the clutch function of the vibration element 11, a reaction force intermittently arises when striking the relative moving member 12. This intermittent reaction force (namely, vibration) is transmitted to the pressure support member 14.

In accordance with the second embodiment of the present invention, the vibration absorbing member 28 is preferably a thin sheet member of silicone rubber. Alternatively, a thin sheet member made of natural rubber, neoprene rubber, or the like can be used as the vibration absorbing member 28. The vibration absorbing member 28 is interposed between the ends of the pressure units 21a, 21b formed on the pressure receiving member 21, and the upper surface of the vibration element 11.

The vibration absorbing member 28, even when simply interposed between the vibration element 11 and the relative moving member 12, has the effect of absorbing the vibration generated when the vibration element 11 strikes the relative moving member 12. However, in accordance with the second embodiment of the present invention, the vibration absorbing member 28 is united by adhesive between the upper surface of the vibration element 11 and the end surfaces of the pressure units 21a, 21b. Accordingly, there is no layer of air present between the vibration element 11 and the pressure receiving member 21, and the vibration absorbing effect of the vibration absorbing member 28 with respect to the pressure receiving member 21 is further increased.

In the above-described manner, in accordance with the second embodiment of the invention, in a manner similar to the first embodiment, vibration arising in the relative moving member 12 is absorbed by the vibration absorbing member 28, and the second base member 15 does not vibrate.

Figure 8:
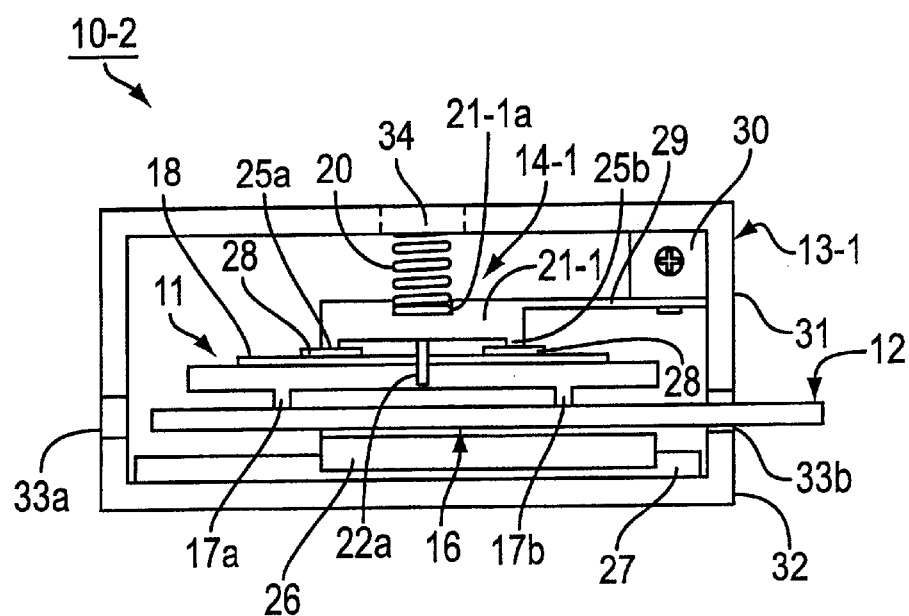
FIG. 8 is an elevation view of an ultrasonic motor in accordance with a third embodiment of the present invention.

FIG. 8 is an elevation view of an ultrasonic motor 10-2 in accordance with a third embodiment of the present invention.

In accordance with the first and second embodiments of the invention, the vibration element 11 travels with respect to a fixed relative moving member 12. However, in accordance with the third embodiment, the vibration element 11 is fixed and the relative moving member 12 is conveyed.

The ultrasonic motor 10-2, in accordance with the third embodiment, comprises a vibration 1-0 element 11, a relative moving member 12, a pressure support member 14-1, a base member 13-1 and vibration absorbing members 16, 28. The various elements of the third embodiment will now be described in more detail hereinbelow.

In accordance with the third embodiment of the present invention, the vibration element 11 is the same as the vibration element 11 of the first and second embodiments. Accordingly, a description of the vibration element 11 will not be repeated here.

In accordance with the third embodiment of the present invention, the relative moving member 12 moves in the left and right direction in the drawing as a result of the elliptical motion generated in the driving force output members 17a, 17b of the vibration element 11. The relative moving member 12 itself is the same as the relative moving member 12 described with respect to the first and second embodiments. Accordingly, a detailed description of the relative moving member 12 will not be repeated here.

As shown in FIG. 8, the pressure support member 14-1 includes a pressure member 20 and a pressure receiving member 21-1. In accordance with the third embodiment of the present invention, the pressure member 20 is preferably a coil spring. Alternatively, the pressure member 20 may be a disk spring or a plate spring and the like pressure members, instead of a coil spring. The pressure member 20 is installed in a mounting hole 21-1a disposed in about the center of the upper surface of the pressure receiving member 21-1.

The pressure receiving member 21-1 includes projecting portions 25a, 25b at both ends. Moreover, a connection unit 29 having a thin plate form is formed in the pressure receiving member 21-1. An end portion of the connection unit 29 is screwed to a fixed portion 30 disposed in the inner surface corner portion of a base member 13-1, which will be described in more detail hereinafter. The pressure receiving member 21-1 is restricted in the relative motion direction by the connection unit 29 screwed to the fixed portion 30, and supported for free displacement with respect to the pressure direction of the pressure member 20. The structure, apart from the pressure receiving member 21-1, is the same as that of the pressure receiving member 21 in accordance with the first embodiment, and a detailed description will therefore not be repeated here.

In accordance with the third embodiment of the present invention, the base member 13-1 supports and houses the pressure support member 14-1. The base member 13-1 is a box-shaped housing member which combines, by suitable means, an upper base member 31 and a lower base member 32. Aperture portions 33a, 33b are formed between the upper base member 31 and the lower base member 32 through which the relative moving member 12 passes.

The fixed portion 30 is disposed in an interior surface corner portion of the upper base member 31. An end of the connection unit 29 of the pressure receiving member 21-1 is screwed to the bottom surface of the fixed portion 30. Moreover, a screw member 34 is screwed in about the center of the roof surface of the upper base member 31, into a portion which is abutted by the coil spring 20 mounted in the mounting hole 21-1a. The length of the coil spring 20 can be varied by varying the screwed-in position of the screw member 34. By varying the position of the screw member 34, the pressure on the pressure receiving member 21-1 can be adjusted by adjusting the spring force generated by the coil spring 20.

Moreover, the rail 27 is positioned with its length in a direction parallel to the direction of movement of the relative moving member 12, in the bottom portion of the lower base member 32.

A guide 26 is fixed, via a vibration absorbing member 16, which will be described in more detail hereinafter, to a bottom surface of the relative moving member 12. The guide 26 fits in the rail 27, and has some clearance. Accordingly, the guide 26 is guided by the rail 27 in a direction parallel to the movement direction of the relative moving member 12. As a result of the above-described structure, the relative moving member 12 is arranged to move freely and rectilinearly with respect to the base member 13-1.

In accordance with the third embodiment of the present invention, in a manner similar to the first embodiment, by adhering a vibration absorbing member 16 to the entire surface of the guide 26 toward the[]relative moving member 12, the vibration absorbing member 16 is arranged between the relative moving member 12 and the base member 13-1.

Moreover, in accordance with the third embodiment of the present invention, in a manner similar to the second embodiment, the vibration absorbing member 28 is interposed between the ends of the projecting portions 25a, 25b formed in the pressure receiving member 21-1 and the upper surface of the vibration element 11. Furthermore, the vibration absorbing member 28 is united to the entire surface of the vibration element 11 and the pressure receiving member 21-1.

The operation of the ultrasonic motor 10-2, in accordance with the third embodiment of the present invention, will now be described in detail below.

As described above, when the ultrasonic motor 10-2 starts (i.e., is driven), elliptical motion is respectively generated, having phases mutually displaced by π, in the driving force output members 17a, 17b of the vibration element 11. The elliptical motion of the driving force output members 17a, 17b moves the relative moving member 12 rectilinearly in the left and right directions in the figure when the driving force output members 17a, 17b strike the relative moving member 17. The guide 26 also moves, accompanying the movement of the relative moving member 12, while being guided by the rail 27.

In accordance with the third embodiment of the present invention, in order to ensure sufficient starting thrust by the ultrasonic motor 10-2, the hardness of the respective driving force output members 17a, 17b is set at a high hardness of 75 of more on the Rockwell M scale. Because of the clutch function and the driving force output members having the high hardness, the relative moving member 12 is usually struck by the driving force output members 17a, 17b of the vibration element 11, and vibration is generated accompanying the striking of the relative moving member 12.

However, in the accordance with the third embodiment of the present invention, the vibration absorbing member 16 is arranged between the relative moving member 12 and the guide 26. Because of the arrangement of the vibration absorbing member 16, the vibration arising in the relative moving member 12 is absorbed by the vibration absorbing member 16, and is not transmitted to the guide 26, the rail 27, or furthermore to the base member 13-1. Moreover, vibration does not arise in the guide 26, the rail 27, or furthermore in the base member 13-1, and the generation of noise and the reduction of driving efficiency are reliably prevented.

Moreover, in accordance with the third embodiment of the present invention, the vibration absorbing member 28 arranged between the vibration element 11 and the pressure support member 14-1 absorbs the vibration arising when the vibration element 11 strikes the relative moving member 12 in effecting the clutch function, and the vibration is not transmitted to the pressure support member 14-1 or to the base member 13-1. Because of the vibration absorbing member 28, vibration does not arise in the pressure support member 14-1 or the base member 13-1, and the generation of noise and the reduction of driving efficiency are reliably prevented.

COMPARATIVE EXAMPLES

Driving trials were performed using the ultrasonic motor 10 in accordance with the embodiments of the present invention, as shown in FIGS. 1–6, and comparative examples were determined as set forth in Tables 1 and 2 below.

TABLE 1

| Constituent Part | Item | Measurement Result |
|---|---|---|
| Vibration element 11 | Dimensions (length, width, thickness; mm) | 50, 10, 3 |
| | Drive frequency (kHz) | 48 |

TABLE 1-continued

| Constituent Part | Item | Measurement Result |
|---|---|---|
| | Rated voltage (Vrms) | 40 |
| | Rated load (N) | 8 |
| | Rated speed (mm/sec) | 100 |
| | Material | SUS304 |
| Relative moving member 12 | Material | SUS410 |
| Driving force output members 17a, 17b | Material | see Table 2 |
| Vibration absorbing member 16 | Article name | Butyl rubber tape D-251 Tokyo Sound Insulation (Co.) |
| | Thickness (mm) | 1 |
| Pressure support member 14 | Pressure force (N) | 12 |

Furthermore, by varying the chief constituent of the driving force output members 17a, 17b in three (3) levels, POM, PEEK and PTFE, the hardness of the driving force output members 17a, 17b was changed in three (3) levels, HRM 75, HRM 105, and HRM 45, and both the starting thrust and whether noise was present were observed. The results are shown in. Table 2. Furthermore, in Table 2, * denotes outside the range of the present invention.

TABLE 2

| Driving force output member hardness | Vibration absorption member | Noise | Starting thrust | Jgmt. | Classification |
|---|---|---|---|---|---|
| HRM 75 | None* | Yes | 180 gf | x | Prior 1 |
| | Butyl rubber | No | 200 gf | o | Inv. Ex. 1 |
| HRM 105 | None* | Yes | 180 gf | x | Prior 2 |
| HRM 45 | Butyl rubber | No | 206 gf | o | Inv. Ex. 2 |
| | None* | Yes | 150 gf | x | Compar. |

KEY to Table 2
Jgmt. = Assessment;
Prior = prior art example;
Inv. Ex. = Present invention, example;
Compar. = comparison example.

The present invention examples 1 and 2 (Inv. Ex. 1, Inv. Ex. 2) both comprise driving force output members 17a, 17b having a high hardness of HRM 75 or more, and because of the high hardness of the driving force output members 17a, 17b, sufficient starting thrust is provided. Moreover, because the vibration absorbing member 16 is disposed, the vibration of the relative moving member 12 is absorbed by the vibration absorbing member 16, and the generation of noise is eliminated. Thus, in accordance with embodiments of the present invention, an ultrasonic motor 10 is provided which has sufficient starting thrust and does not generate noise.

In contrast to the present invention, prior art examples 1 and 2, each having driving force output members 17a, 17b having a high hardness of HRM 75 or more, had sufficient starting thrust. However, because the prior art examples 1 and 2 did not include a vibration absorbing member 16, noise was generated when the ultrasonic motor was driven.

Furthermore, in the comparison example, wherein the driving force output members 17a, 17b had a low hardness, below HRM 75, and the vibration motor did not include the vibration absorbing member 16, noise was generated and the starting thrust was insufficient.

From the results of Table 2, it can be seen that, when driving force output members 17a, 17b having a high hardness of HRM 75 or more are used, a strong impulse is obtained which can provide sufficient starting thrust to the relative moving member 12. Furthermore, by disposing the vibration absorbing member 16, the vibration caused by the impulse force can be absorbed, and the generation of noise and a reduction of driving efficiency can be prevented.

Moreover, it can be seen that, when driving force output members 17a, 17b having a low hardness of less than HRM 75 are used, a small impulse is provided to the relative moving member 12, noise is generated, and a sufficient starting thrust is not obtained.

A fourth embodiment of the present invention will now be described below with reference to FIG. 9 in which a moving stage using the above-described ultrasonic motor is applied to an optical fiber switch.

Figure 9:
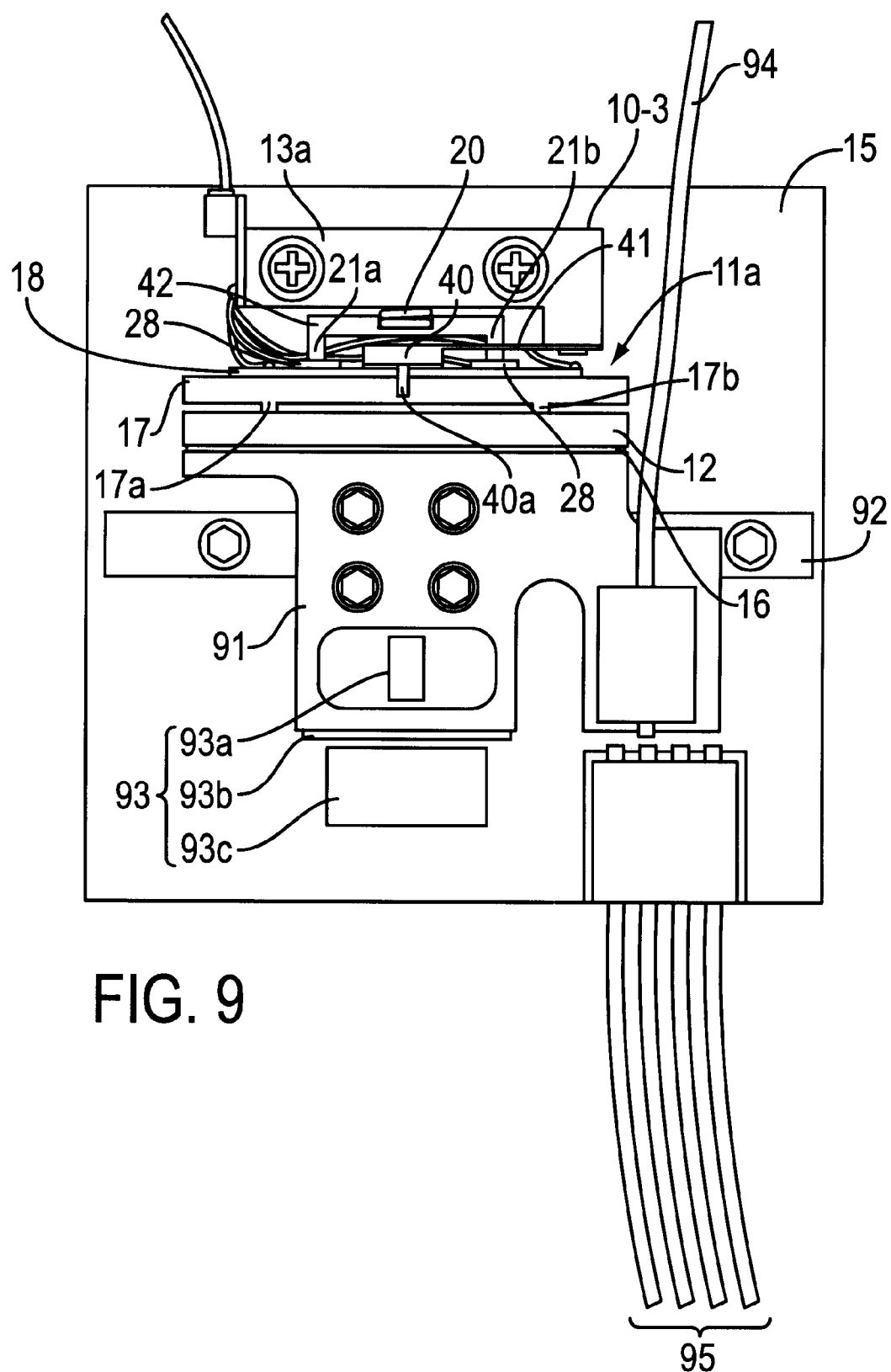
FIG. 9 is an external view of an optical fiber switch in accordance with embodiments of the present invention.

More specifically, FIG. 9 is an external view of a vibration motor and optical fiber switch in accordance with the fourth embodiment of the present invention. Furthermore, elements shown in FIG. 9 which are the same as those shown in FIGS. 1–8 are referred to by the same reference numbers, and a detailed description of these like elements will not be repeated here.

The optical fiber switch comprises a vibration element 11a, a relative moving member 12, a vibration element support member 40, a pressure member 42, a first base member 13a, a second base member 14, vibration absorbing members 16, 28, a moving stage 91, a rail 92, a linear guide on the rail 92 (not shown in FIG. 8), an encoder 93, a first optical fiber 94, and a second optical fiber 95. The linear guide 92 is fixed to the second base member 15.

The optical fiber switch performs optical connection or isolation between the first optical fiber 94 and the second optical fibers 95, by fixing one end of the first optical fiber 94 to the moving stage 91, and positioning one end of the second optical fiber 95 such that the first and second optical fibers have an about common optical axis, and by moving the first optical fiber 94. Furthermore, in accordance with the fourth embodiment of the present invention, a plurality of the second optical fibers 95 may be fixed, and the optical fiber switch can be used as a switch which performs changeover of an optical fiber communication network by optically connecting any one of the second optical fibers 95 by causing the first optical fiber 94 to move.

To employ the optical fiber switch as an optical fiber communication network switch, the moving stage 91 is supported by a linear guide on the rail 92 such that it is able to move in the same direction as the arrayed direction of the one end of the second optical fiber(s) 95. Exciting the vibration element 11a causes the moving stage 91 to move along the rail 92. Next, by aligning an optional one of the second optical fibers 95 and the first optical fiber 94 such that the first optical fiber 94 and the second optical fiber 95 form a contiguous optical path, changeover of optical fibers is performed.

Furthermore, in accordance with the fourth embodiment of the invention, as shown in FIG. 9, preferably one first optical fiber is fixed to the moving stage 91, and four second optical fibers 95 are fixed to the second base member 15. However, the present invention is not limited to this configuration, and the optical fiber switch may comprise a plurality of first optical fibers fixed to the moving stage 91, and one second optical fiber 95 fixed to the second base member 15. Moreover, the optical switch may comprise a plurality of first optical fibers and a plurality of second optical fibers.

Moreover, the thrust of the moving stage 91 is obtained from the vibration element 11a of the vibration motor 10-3.

The vibration element 11a is the same as the vibration element used in the vibration motor shown in FIG. 5. The driving force output members 17a, 17b have a high hardness of at least 75 on the Rockwell M scale. However, the vibration element 11a has a semicircular notch contiguous to the nodal portion $n_3$ which touches a node of the vibration when the elastic member 17 vibrates.

The vibration element 11a is supported by the vibration element support member 40 such that it does not move with respect to the movement of the relative moving member 12. The vibration element support member 40 is preferably formed of an aluminum or stainless steel metal material, and a portion of the vibration element support member 40 is in contact with the surface of the elastic member 17 on which the piezoelectric element 18 is disposed. Moreover, a beam member 41 is disposed in the vibration element support member 40. The vibration element support member 40 is fixed to the first base member 13a by the beam member 41. Two support pins 40a, which are preferably made of stainless steel, extend from the vibration element support member 40. Respective portions of the support pins 40a are adhered in the notch formed in the elastic member 17. The vibration element 11a is supported by the support pins 40a such that it does not move accompanying the movement of the relative moving member 12. Furthermore, an insulating layer is disposed in the contact surface of the vibration element support member 40 and the elastic member 17.

Moreover, a pressure member 42 causes the elastic member 17 to be in pressure contact with the relative moving member 12. The pressure member 42 is disposed between the first base member 13a and the vibration element 11a in the same manner as the pressure receiving member 21 described with respect to the first embodiment. Moreover, the pressure member 42 includes pressure units 21a, 21b at its two ends in a manner similar to the pressure receiving member 21. Furthermore, in accordance with the fourth embodiment of the present-invention, a compressed coil spring 20 is positioned between the first base member 13a and the pressure member 42. The restoring force of the coil spring 20 urges the vibration element 11a in the direction of the relative moving member 12 via the pressure member 42. Furthermore, the respective contact positions of the pressure units 21a, 21b with respect to the vibration element 11a coincide with the positions of the two (2) nodal positions $n_2$, $n_4$ when the vibration element 11a is excited. Moreover, the pressure units 21a, 21b are arranged to avoid the surface electrodes of the detection region piezoelectric members and the input region piezoelectric members, and the raised solder portions where lead wires are connected.

Incidentally, the first base member 13a is fixed to the second base member 15 with bolts. The first base member 13a receives one end of the compression coil spring 20 to cause a pressure force to arise on the vibration element 11a. A screw member (not shown in the drawing) is disposed in the portion of the first base member 13a which receives the coil spring 20, and the restoring force generated by the coil spring 20 can be adjusted by the amount of advance of the screw member. Furthermore, the first base member 13 fixes the lead wire which supplies the vibration element 11a. Accordingly, the portion of the lead wire which moves accompanying the movement of the vibration element 11a is small, and a change of the resonant frequency of the vibration element 11a as a result of the mounting of the lead wire can be suppressed.

The relative moving member 12 is fixed to the moving stage 91 via the vibration absorbing member 16. The moving stage 91 preferably comprises a light metal such as aluminum. The first optical fiber and the scale of the encoder 93 are fixed to a portion of the moving stage 91.

Moreover, the encoder 93 comprises a light emitting unit 93a, a scale 93b, and a reading unit 93c. In accordance with the fourth embodiment of the invention, the respective members 93a, 93b, 93c are disposed on the second base member 15 and the moving stage 91. The light emitting unit 93a is installed in a hole portion which is a hollow cavity in the moving stage 91. The scale unit 93b is fixed to the moving stage 91, and furthermore the reading unit 93c is fixed to the second base member 15. The light emitted from the light emitting unit 93a passes through the scale unit 93b and is received by the reading unit 93c. The position of the moving stage 91 is detected by the encoder 93, and the position of the end of the first optical fiber 94 is thereby determined.

The vibration absorbing member 16 is positioned between the relative moving member 12 and the moving stage 91, which is movably supported in the second base member 15. In the above-described manner, the vibration generated by the clutch action of the vibration element 11a can be prevented from being transmitted to the moving stage 91. Accordingly, the present embodiment solves the problems of the moving stage 91 vibrating while connecting adjacent optical fibers, and the unsatisfactory transmission of light between optical fibers.

Moreover, in accordance with the fourth embodiment of the present invention, as shown in FIG. 9, a vibration absorbing member 28 is also positioned between the pressure member 42 and the vibration element 11a. Accordingly, the transmission of the vibration of the vibration element 11a to the second base member 15 via the pressure member 42 and the first base member 13a, causing the second optical fiber 95 to vibrate, can be prevented.

Figure 10:
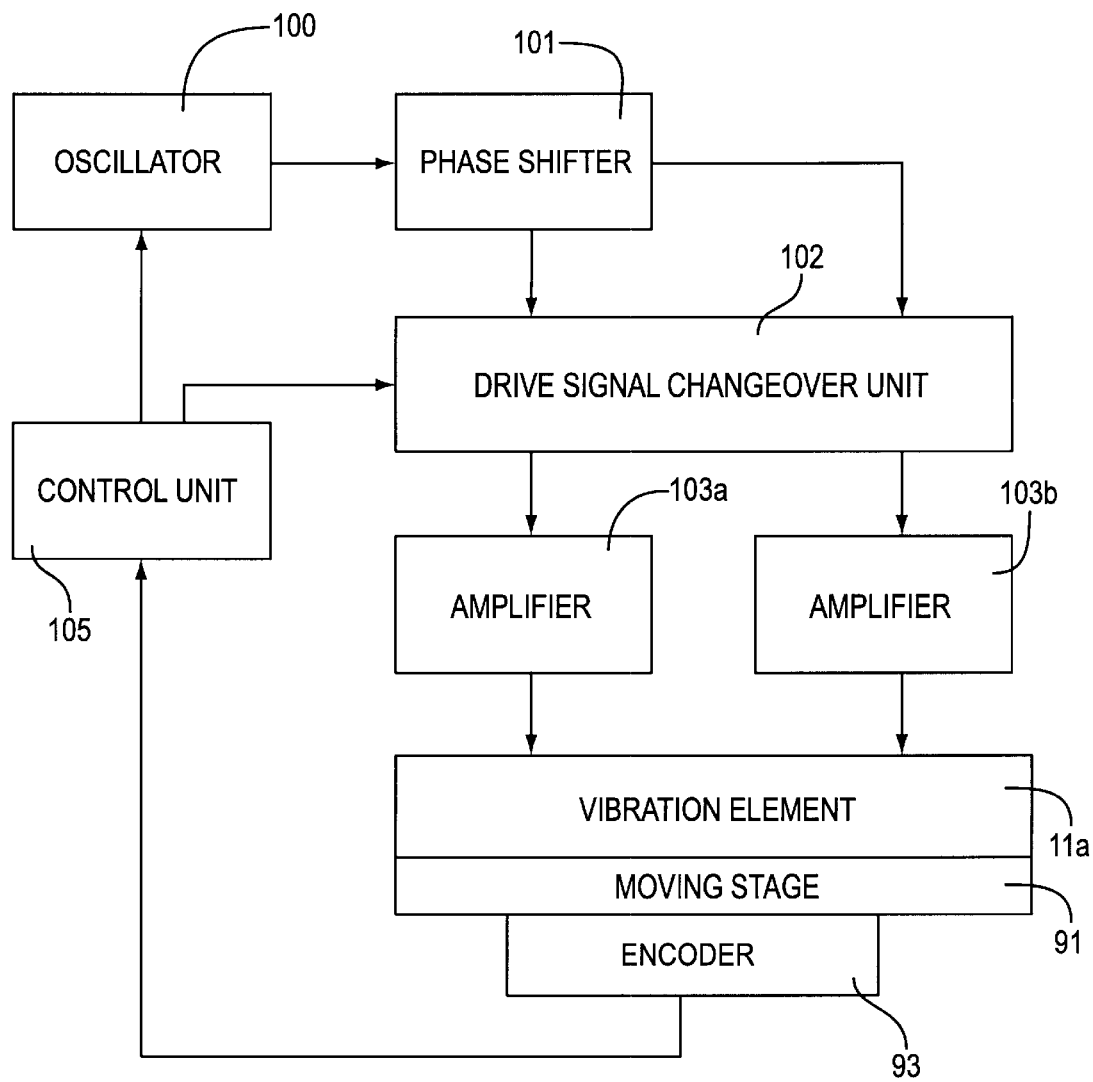
FIG. 10 is a block diagram of a circuit to perform drive control of the optical fiber switch shown in FIG. 9 in accordance with embodiments of the present invention.
Figure 11:
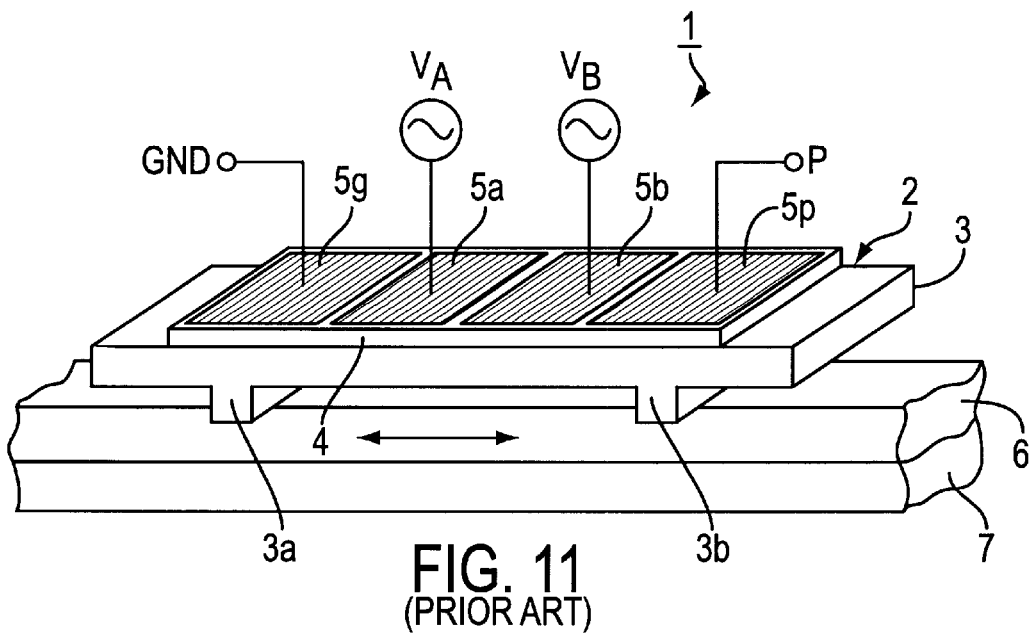
FIG. 11 is a perspective view of a conventional vibration motor having a vibration element.
Figure 12A:
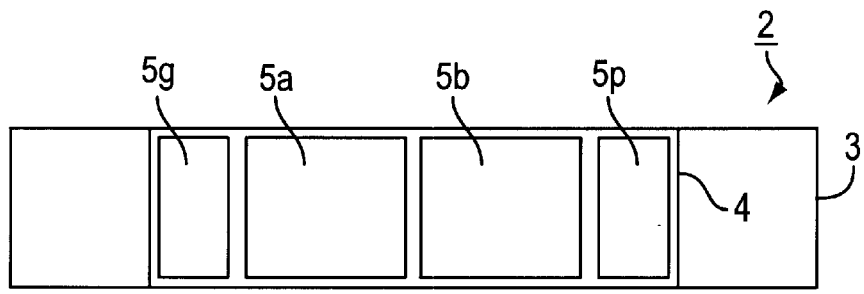
FIGS. 12A–12C are a top view, a side view and a descriptive diagram, respectively, of the conventional vibration element shown in FIG. 11.
Figure 12B:
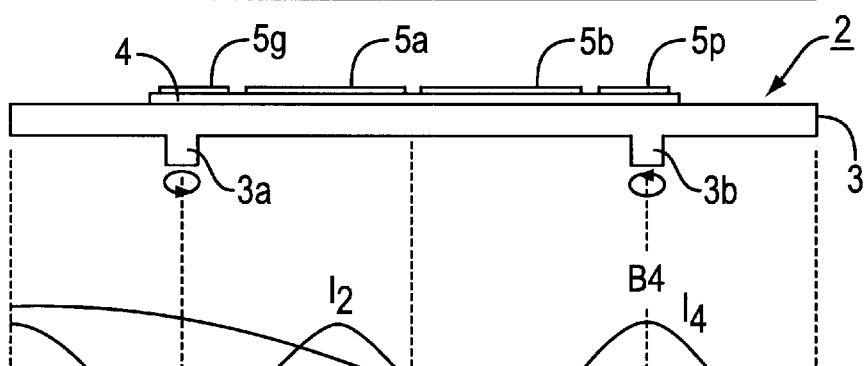
Figure 12C:
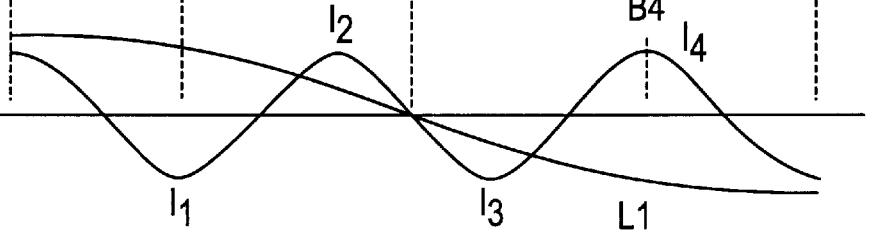

A drive control unit of the optical fiber switch shown in FIG. 9 will now be provided below. A block diagram of the circuit which performs drive control of the optical fiber switch is shown in FIG. 10.

The drive control unit comprises an oscillator 100, a phase shifter 101, a drive signal changeover unit 102, amplifiers 103a, 103b, and a control unit 105.

The oscillator 100 receives instructions from the control unit 105 and generates a high frequency drive signal according to the instructions from the control unit 105. In accordance with the present embodiment, a drive signal having a predetermined frequency is generated by the oscillator 100 according to the voltage from the control unit 105. More specifically, the oscillation frequency varies according to the voltage time emitted from the control unit 105.

The phase shifter 101 divides the drive signal generated by the oscillator 100 and outputs two drive signals, displaced 90 degrees in phase. The drive signal changeover unit 102 changes the method of transmission of the drive signal to the vibration element 11a between a signal when driving the vibration motor with coarse movement and a signal when driving with fine movement. During coarse movement driving, a coarse drive signal is supplied to the drive signal changeover unit 102 from the control unit 105, and during fine driving, a fine drive signal is supplied from the control unit 105. Based on the signal from the control unit 105, during coarse driving two drive signals from the phase shifter 101 are transmitted to the respective amplifiers 103a, 103b. The drive signals from the phase shifter 101 are transmitted as A phase and B phase signals to the vibration element 11a. Moreover, during fine driving, the drive signal changeover unit 102 transmits only one of the two (2) drive signals from the phase shifter 101 to either one of the respective amplifiers 103a, 103b. The amplifiers 103a, 103b step up the drive signals from the drive signal changeover unit 102 to the desired voltage. At this time, a drive signal having only either one of the A phase and B phase is input to the vibration element 11a.

The control unit 105 receives a detection signal from the encoder 93, and controls the oscillator 100 and the drive signal changeover unit 102 based on the value of the signal from the encoder 93. In accordance with the present embodiment, in the case of moving the moving stage 91 from some position to a desired position, the control unit 105 changes the magnitude of the voltage which it applies to the oscillator 100. The oscillator 100 causes changes of the frequency of the drive signal according to the voltage applied from the control unit 105. Moreover, the control unit 105 also outputs coarse drive signals to the drive signal changeover unit 102.

In accordance with the embodiments of the present invention, the vibration motor performs the following control when starting. The control unit 105 performs control to vary to a frequency close to the resonance point of the vibration element 11a from a frequency initially separated from the resonance point of the vibration element 11a. The frequency signal output from the oscillator 100 is then formed into two (2) drive signals by the phase shifter 101. As described above, these two drive signals are input to respective amplifiers 103a, 103b from the drive signal changeover unit 102. After the drive signals have been respectively stepped up to the predetermined voltage, the alternating voltages are then applied to the A phase and B phase of the vibration element 11a.

Furthermore, the speed of movement of the moving stage 91 becomes fast as the frequency of the output from the oscillator 100 becomes close to the resonance point of the vibration element 11a.

Next, when the position of the moving stage 91 is close to the desired position, the control unit 105 causes the voltage supplied to the oscillator 100 to change, so that the frequency output from the oscillator 100 becomes separated from the resonance point. The position of the moving stage 91 is then compared with the desired position. At this time, if the moving stage 91 is displaced from the desired position, the control unit 105 then intermittently applies an alternating voltage having a predetermined amplitude voltage to the oscillator 100, and outputs a fine movement drive signal to the drive signal changeover unit 102.

That is, when intermittently applying to the oscillator 100 an alternating voltage having a predetermined amplitude, a drive signal having a frequency according to the voltage value which is applied is output from the oscillator 100, only at the time at which the alternating voltage is applied. This operation is performed for a certain period until the moving stage 91 is in the predetermined position. The other side, the control unit 105 generates a fine movement drive signal with respect to the drive signal changeover unit 102. The drive signal changeover unit 102 which receives the fine movement drive signal, outputs to only one of the amplifiers 103a, 103b, one or the other of the two (2) drive signals output from the phase shifter 101. For example, as seen in FIG. 9, using the vibration element 11a comprising the electrode shown in FIG. 5, when fine movement is caused to the left or right, the drive signal changeover unit 102 changes the drive signal such that only the A phase drive signal is applied. Furthermore, when fine movement is caused in the opposite direction, only the B phase drive signal may be applied.

Fine movement is performed in the above-described manner, and the moving stage 91 can be set in the desired position with high accuracy.

The present invention is not limited to the embodiments described above. For example, in the description of each of the embodiments above, the vibration motors 10, 10-1, 10-2, 10-3 are described as being ultrasonic motors using the ultrasonic vibration region. However, the present invention is not limited to vibration motors using vibration in the ultrasonic region, and other vibration motors are equally applicable to the present invention which use vibration regions other than the ultrasonic region.

Moreover, in accordance with the embodiments of the present invention described hereinabove, the electromechanical conversion unit is a piezoelectric element 18. However, the present invention is not limited to using a piezoelectric element as the electromechanical conversion unit, and other elements which can convert electrical energy into mechanical energy are equally applicable. For example, an electrostrictive member can be used instead of a piezoelectric element.

Moreover, in accordance with the embodiments of the invention described hereinabove, a vibration element 11 having degenerate modes of different form is used, which generates in the elastic member 17 a first order longitudinal vibration L1 and a fourth order bending vibration B4 However, the present invention is not limited in the kind of vibration generated by the vibration element. For example, the present invention is equally applicable to a vibration element provided with degenerate modes having different form, generating first order, third order, and the like longitudinal vibrations, and second order, sixth order or eighth order and the like bending vibration modes. More particularly, the present invention is equally applicable to a vibration element which provides a vibration mode with degenerate modes having different form which generate a first vibration in the relative movement direction, and a second vibration which vibrates in a direction intersecting the relative movement direction.

Moreover, in accordance with the embodiments of the invention described hereinabove, the vibration element 11 has two driving force output members 17a, 17b. However, the present invention is not limited in the number of driving force output members. For example, a vibration motor including a vibration element having one (1) or four (4) driving force output members is also equally applicable to the present invention.

Moreover, a pressure support member 14 was used in the first and second embodiments, to and a pressure support member 14-1 in the. third embodiment. However, the present invention is not limited to a specific configuration of the pressure support member. In accordance with the present invention, the pressure support member may be any member having the function of causing a vibration element 11 to be in pressure contact with the relative moving member 12, fixed between a first base member 13 or base member 13-1, and the vibration element 11.

Moreover, in accordance with the first embodiment of the present invention, the vibration absorbing member 16 is described as a thin sheet of butyl rubber, or, alternatively, the vibration absorbing member 16 may also be a thin strip made of lead. Moreover, in accordance with the second embodiment of the present invention, the vibration absorbing member 28 is described as a thin strip made of silicone rubber or the like. Moreover, embodiments of the invention discussed above disclose that a thin strip member made of natural rubber, neoprene rubber or the like can be used as the vibration absorbing member. However, in accordance with the present invention, neither of the vibration absorbing members 16, 28 is limited in any way in material or form. The vibration absorbing member 16 may be any member which can absorb the vibration arising in the relative moving member 12 as a result of the elliptical motion generated in the vibration element 11. Moreover, the vibration absorbing member 28 may be any member such that the vibration generated when the vibration element 11 strikes the relative moving member 12 does not transmit to the pressure support member 14, 14-1 and the pressure member 42.

Moreover, in accordance with the first embodiment of the present invention, the vibration absorbing member 16 is described as interposed between the second base member 15 and the relative moving member 12. Furthermore, in accordance with the second embodiment of the present invention, the vibration absorbing member 16 is described as interposed between the second base member 15 and the relative moving member 12, and the vibration absorbing member 28 is described as interposed between the vibration element 11 and the pressure support member 14. Furthermore, in accordance with the third embodiment of the present invention, the vibration absorbing member 16 is described as interposed between the base member 13-1 and the relative moving member 12, and the vibration absorbing member 28 is described as interposed between the vibration element 11 and the pressure support member 14-1. However, the positional arrangement of the vibration absorbing members 16, 28 is not limited to the positional arrangements described above. For example, the vibration absorbing members 16, 28 may be interposed between the pressure support members 14, 14-1 or the pressure member 42 and the base members 13, 13-1, 13a. Accordingly, vibration of the base members 13, 13-1, 13a via the pressure support members 14, 14-1 and the pressure member 42 caused by the vibration arising when the vibration element 11, 11a strikes the relative moving member 12 can be eliminated.

Furthermore, embodiments of the present invention are described hereinabove in which the respective vibration absorbing members 16, 28 are united to at least one of the first base member 12, the second base member 14, the base member 13-1, the vibration element 11 and the relative moving member 12. However, the present invention is not limited to these configurations of the vibration absorbing members 16, 28. The vibration absorbing members 16, 28 may be interposed between at least one of the first base member 13 or the base member 13-1 and the pressure support members 14, 14-1, between the pressure support members 14, 14-1 and the vibration element 11, and between the relative moving member 12 and the second base member 15 or the base member 13-1.

In accordance with embodiments of the present invention as described in detail hereinabove, when driving a vibration motor having a vibration element using degenerate modes of different form, the generation of noise and the reduction in driving efficiency, which originate from vibration arising in the base member, can both be reliably prevented.

In particular, in accordance with embodiments of the present invention, by providing drive force output members having a hardness of 75 or more on the Rockwell M scale, while ensuring sufficient thrust, noise originating from vibration arising in the base member, and the reduction of driving efficiency, can both be reliably prevented.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A vibration motor, comprising:
   a vibration element including a driving force output member, which is excited to produce a combination of different vibrations and to generate an elliptical vibration in the driving force output member;
   a relative moving member in pressure contact with the driving force output member to move in relative motion with respect to the vibration element;
   a first base member;
   a pressure support member, fixed between the vibration element and the first base member, to place the vibration element in pressure contact with the relative moving member;
   a second base member to support the relative moving member; and
   a vibration absorbing member to absorb vibration produced by the elliptical vibration generated by the vibration element in at least one of the relative moving member and the pressure support member,
   the vibration absorbing member being disposed in at least one of between the first base member and the pressure support member, between the pressure support member and the vibration element, and between the relative moving member and the second base member.

2. A vibration motor, comprising:
   a vibration element including a driving force output member, which is excited to produce a combination of different vibrations and to generate an elliptical vibration in the driving force output member;
   a relative moving member, in pressure contact with the driving force output member, to move in relative motion with respect to the vibration element;
   a pressure support member to place the vibration element in pressure contact with the relative moving member;
   a base member to support the relative moving member and the pressure support member, wherein said base member remains substantially stationary with respect to the relative moving member; and
   a vibration absorbing member to absorb vibration in at least one of the relative moving member and the pressure support member produced by the elliptical vibration generated by the vibration element,
   the vibration absorbing member being disposed in at least one of between the base member and at least one of the relative moving member and the support member and between the vibration element and the pressure support member.

3. A vibration motor as recited in claim 1, wherein at least one of the different vibrations is in a direction approximately parallel to the direction in which the pressure support member generates pressure force.

4. A vibration motor as recited in claim 2, wherein at least one of the different vibrations is in a direction approximately parallel to the direction in which the pressure support member generates pressure force.

5. A vibration motor as recited in claim 1, wherein the vibration element comprises a plurality of driving force output members, and a phase of the elliptical vibration which is respectively generated in the plurality of driving force output members mutually differs.

6. A vibration motor as recited in claim 2, wherein the vibration element comprises a plurality of driving force output members, and a phase of the elliptical vibration which is respectively generated in the plurality of driving force output members mutually differs.

7. A vibration motor as recited in claim 1, wherein the hardness of the driving force output member is at least 75 on the Rockwell M scale.

8. A vibration motor as recited in claim 2, wherein the hardness of the driving force output member is at least 75 on the Rockwell M scale.

9. A vibration motor as recited in claim 1, wherein the vibration absorbing member is united to at least one the first base member, the second base member, and the relative moving member.

10. A vibration motor as recited in claim 2, wherein the vibration absorbing member is united to at least one of the base member and the relative moving member.

11. A vibration motor, comprising:
    a vibration element including a driving force output member having a Rockwell M scale hardness of at least 75, and which generates an elliptical vibration comprising different vibrations in the driving force output member;
    a relative moving member in pressure contact with the driving force output member to move in relative motion with respect to the vibration element;
    a base member to support at least one of the vibration element and the relative moving member; and
    a vibration absorbing member to absorb vibration generated by the vibration element, the vibration absorbing member being disposed in at least one of between the base member and the vibration element and between the relative moving member and the base member.

12. A vibration motor as recited in claim 11, further comprising:
    an optical fiber switch including a first optical fiber fixed to the base member and a second optical fiber fixed to a portion which is relatively movable with the vibration element with respect to the base member,
    wherein relative movement of the first optical fiber and the second optical fiber causes optical connection and disconnection of the first optical fiber and the second optical fiber.

13. A vibration motor as recited in claim 12, wherein the optical fiber switch includes a plurality of first optical fibers fixed to the base member and a plurality of second optical fibers fixed to the portion which is relatively movable, and the relative movement of the plurality of first optical fibers and the plurality of second optical fibers causes optical connection and disconnection of the first optical fibers and second optical fibers.

14. A vibration motor, comprising:
    a vibration element including a driving force output member having a Rockwell M scale hardness of at least 75, and which generates an elliptical vibration comprising different vibrations in the driving force output member;
    a relative moving member in pressure contact with the driving force output member to move in relative motion with respect to the vibration element;
    a base member to support and fix the vibration element;
    a pressure support member to provide a force causing the vibration element and the relative moving member to contact under pressure, the pressure support member being disposed between the base member and the vibration element; and a vibration absorbing member between the pressure support member and the vibration element to absorb vibration generated by the vibration element.

15. A vibration motor as recited in claim 14, further comprising:

an optical fiber switch, including a first optical fiber fixed to a portion which moves relatively with respect to the vibration element; and a second optical fiber fixed to a portion which moves relatively with respect to the relative moving member, wherein relative movement of the first optical fiber and the second optical fiber cause the optical connection and disconnection of the first optical fiber and the second optical fiber.

16. A vibration motor as recited in claim 1, further comprising;

a weight portion, connected to the first base member, to stabilize the vibration motor.

17. A vibration motor as recited in claim 2, further comprising;

a weight portion, connected to the base member, to stabilize the vibration motor.

18. A vibration motor as recited in claim 1, wherein the vibration absorbing member includes a guide fixed to a bottom surface thereof, said second base member includes an attached rail which is positioned with a length in a direction parallel to a direction of movement of the relative moving member, the guide and the rail are interposed to form a slidable attachment, and said slidable attachment includes clearance between the guide and rail to allow rectilinear movement.

19. A vibration motor as recited in claim 2, wherein the vibration absorbing member includes a guide fixed to a bottom surface thereof, said base member includes an attached rail which is positioned with a length in a direction parallel to a direction of movement of the relative moving member, the guide and the rail are interposed to form a slidable attachment, and said slidable attachment includes clearance between the guide and rail to allow rectilinear movement.

* * * * *